(12) United States Patent
Dutson

(10) Patent No.: US 7,637,841 B2
(45) Date of Patent: Dec. 29, 2009

(54) CONTINUOUSLY VARIABLE RATIO TRANSMISSION UNIT AND METHOD OF ASSEMBLY THEREOF

(75) Inventor: Brian Joseph Dutson, Manchester (GB)

(73) Assignee: Torotrak (Development) Limited, Lancashire (GB)

( * ) Notice: Subject to any disclaimer, the term of this patent is extended or adjusted under 35 U.S.C. 154(b) by 885 days.

(21) Appl. No.: 10/532,484

(22) PCT Filed: Sep. 11, 2003

(86) PCT No.: PCT/GB03/03948

§ 371 (c)(1),
(2), (4) Date: Jan. 9, 2006

(87) PCT Pub. No.: WO2004/038253

PCT Pub. Date: May 6, 2004

(65) Prior Publication Data

US 2006/0160656 A1 Jul. 20, 2006

(30) Foreign Application Priority Data

Oct. 23, 2002 (GB) ................... 0224646.0

(51) Int. Cl.
*F16H 15/38* (2006.01)
(52) U.S. Cl. ............... 476/41; 476/42; 476/46
(58) Field of Classification Search .......... 476/40, 476/41, 42, 46
See application file for complete search history.

(56) References Cited

U.S. PATENT DOCUMENTS 5,316,526 A 5/1994 Fellows

FOREIGN PATENT DOCUMENTS

| DE | 199 61 692 A1 | 6/2001 |
| EP | 1 350 987 A1 | 10/2003 |
| GB | 1 500 763 | 5/1975 |
| JP | 08-135746 | 5/1996 |
| WO | WO 99/34133 | 7/1999 |
| WO | WO 00/15978 | 3/2000 |

OTHER PUBLICATIONS

Patents Act 1977: Search Report under Section 17 for Great Britain Counterpart Application No. GB 0224646.0, 1 pg. (Apr. 3, 2003).
Standard European Search Report for GB Counterpart Patent Application No. 0224646.0, 3 pgs. (Apr. 24, 2003).
International Search Report for PCT Counterpart Application No. PCT/GB03/03948, 4 pgs (Dec. 12, 2003).

*Primary Examiner*—William C Joyce
(74) *Attorney, Agent, or Firm*—Blakely, Sokoloff, Taylor & Zafman LLP

(57) ABSTRACT

A continuously variable ratio transmission unit having a housing (116) and input (102, 106) and output (100) discs paired to define first and second toroidal cavities. The discs (100, 102, 106) are mounted to the housing for rotation about a common axis. First (110) and second (112) rollers—or more typically first and second sets of rollers—are respectively arranged in the first and second cavities and serve to transmit drive between the input and output discs. First (130) and second (148, 150, 152) actuators act on the respective rollers. The first actuator is coupled to a first carrier part (126) which can be mated with the housing introducing it to the housing along a direction generally parallel to the variator axis. The second actuator is coupled to a second carrier part (146) which can be mated with the housing by introducing the second carrier part to the housing along a direction non-parallel to the variator axis.

10 Claims, 6 Drawing Sheets

CONTINUOUSLY VARIABLE RATIO TRANSMISSION UNIT AND METHOD OF ASSEMBLY THEREOF

BACKGROUND OF THE INVENTION

This is a National Phase of International Application No. PCT/GB2003/003948, filed on Sep. 11, 2003, which claims priority from Great Britain Patent Application No. 0224646.0, filed on Oct. 23, 2002.

The present invention relates to a continuously variable ratio transmission unit ("variator") and to a method of assembly thereof.

The general construction of variators of toroidal-race, rolling-traction type will be familiar to the skilled person. Typically two toroidal cavities are defined between facing surfaces of a set of variator discs all of which are mounted for rotation about a common axis. Drive is transmitted between the discs by a set of rollers in both of the cavities and the inclination of the rollers with respect to the discs is able to change in accordance with changes in variator drive ratio. A biasing force, along a direction transverse to the disc axis, is applied to each roller by an actuator which in existing designs is of hydraulic type.

Fabrication and in particular assembly of existing variators is somewhat complex. The discs, actuators and rollers are typically all mounted in a housing and assembling the various parts inside the housing is in current prototypes a somewhat time consuming process not easy to automate or adapt to production line techniques.

A first object of the present invention is to provide a variator which is capable of straightforward assembly.

The need to provide for hydraulic fluid supply to the several actuators has meant some complication in the machining of the variator's components, particularly the housing. The applicant has previously proposed, in order to simplify construction, to form passages for the fluid supply between confronting faces of a multi-part casing—see its published International Patent Application PCT/GB99/02968. Nonetheless an additional or alternative object of certain embodiments of the present invention is to provide, in a variator, a means of fluid supply to the hydraulic actuators which is straightforward in fabrication and assembly.

The shape of the variator housing is in many cases a crucial design issue. The current need is for variators which can be installed in existing motor vehicle designs. Hence in rear wheel drive cars the variator is to be installed in the transmission tunnel. Both excessive length and width of the variator could be problematic, and in particular laterally projecting "lobes" needed in existing designs to accommodate the roller control actuators, create installation difficulties. An additional or alternative object of the present invention is to provide a variator whose external shape is suited to installation in a motor vehicle.

SUMMARY OF THE INVENTION

In accordance with a first aspect of the present invention there is a continuously variable ratio transmission unit ("variator") comprising a housing, a first input/output disc pair defining a first variator cavity, a second input/output disc pair defining a second variator cavity, the discs being mounted to the housing for rotation about a common variator axis, at least one first roller disposed in the first variator cavity and at least one second roller disposed in the second variator cavity, the rollers serving in use to transmit drive between the input and output discs, a first actuator for applying a biasing force to the first roller and a second actuator for applying an adjustable biasing force to the second roller, wherein the first actuator is coupled to a first carrier, the housing and the first carrier being formed such that the first carrier can be mated with the housing by advancing the first carrier in a direction along the variator axis, and the second actuator is coupled to a second carrier, the housing and the second carrier being formed such that the second carrier can be mated with the housing by advancing the second carrier along a direction non-parallel to the variator axis.

In accordance with a second aspect of the present invention there is a method of constructing a continuously variable ratio transmission unit ("variator") comprising a housing, a first input/output disc pair defining a first variator cavity, a second input/output disc pair defining a second variator cavity, the discs being mounted to the housing for rotation about a common variator axis, at least one first roller disposed in the first variator cavity and at least one second roller disposed in the second variator cavity, a first actuator for applying a biasing force to the first roller and a second actuator for applying an adjustable biasing force to the second roller, the method comprising constructing the first actuator on a first carrier and advancing the first carrier in a direction along the variator axis to thereby mate the first carrier to the housing, constructing the second actuator on a second carrier and advancing the second carrier along a direction non-parallel to the variator axis to thereby mate the second carrier to the housing.

In accordance with a third aspect of the present invention there is a continuously variable ratio transmission unit ("variator") comprising a variator housing, a first input/output disc pair defining a first variator cavity, a second input/output disc pair defining a second variator cavity, the discs being mounted to the housing for rotation about a common axis, three first rollers disposed in the first variator cavity and three second rollers disposed in the second cavity, the rollers serving in use to transmit drive between the input and output discs, each of the first rollers being operably coupled to a respective first actuator and each of the second rollers being operably coupled to a respective second actuator, the actuators each serving to apply to their associated rollers an adjustable biasing force and each being mounted to the variator housing, the second actuators all being arranged to one side of a plane containing the variator axis and the first actuators being angularly spaced about the axis and thus disposed to either side of the said plane.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
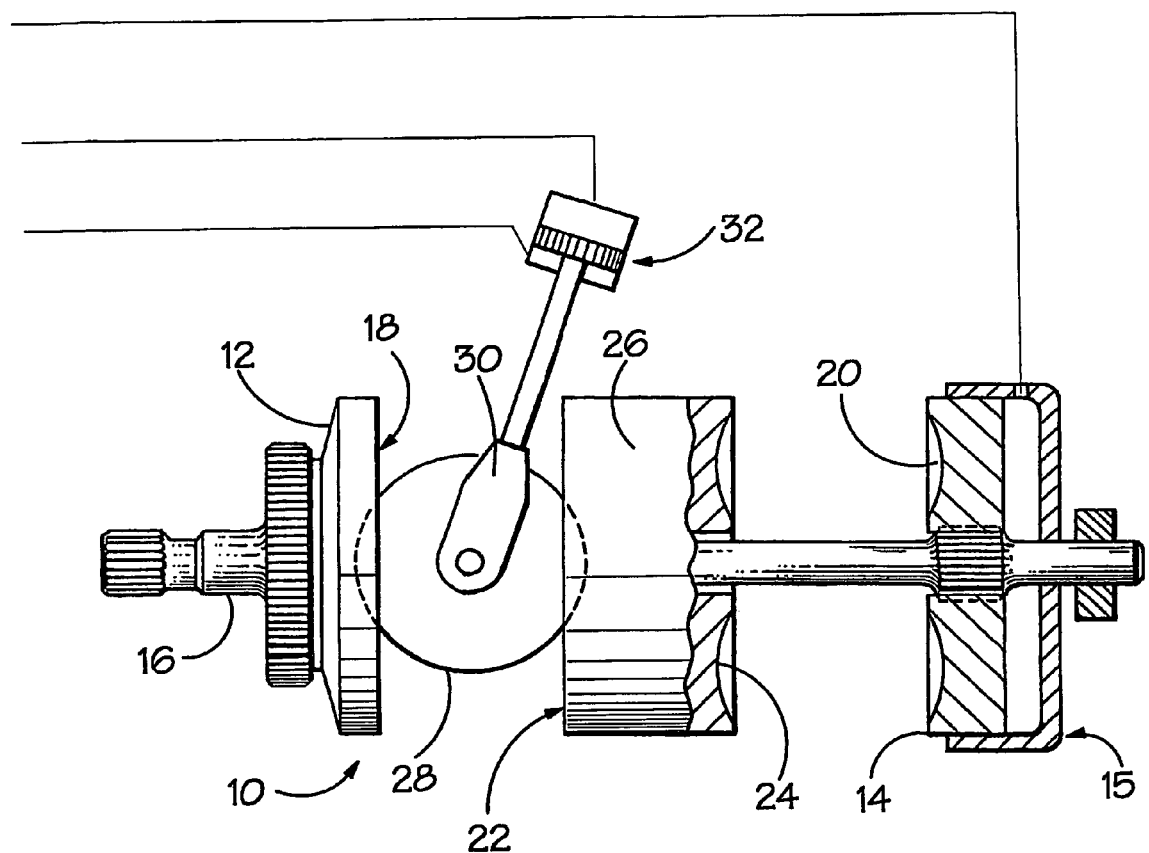
FIG. 1 is a somewhat schematic illustration of major components of a variator of known general type.

The general construction of a toroidal-race, rolling traction type variator will firstly be described with reference to FIG. 1. Here, two input discs 12, 14 are mounted upon a drive shaft 16 for rotation therewith and have respective part toroidal surfaces 18, 20 facing toward corresponding part toroidal surfaces 22, 24 formed upon a central output disc 26. Two toroidal cavities are thus formed by opposing surfaces of the input and output discs. The designation "input" and "output" with regard to the discs is somewhat arbitrary since torque can be transmitted across the variator in either direction (from "input" to "output" or vice versa). A single output disc 26 with two part toroidal faces 22, 24 is shown but two discs, typically back-to-back, can serve the same function. The output disc 26 is journalled such as to be rotatable independently of the shaft 16. Drive from an engine or other prime mover is transferred between input and output discs via a set of rollers disposed in the toroidal cavities. A single representative roller 28 is shown but typically three such rollers are provided in each cavity. An end load applied across the input discs 12, 14 by a hydraulic end load arrangement 15 provides pressure between rollers and discs to enable the transfer of drive. The discs are coupled to further parts of the transmission, typically an epicyclic mixer, as is well known in the art and described e.g. in European patent 185463. Each roller is journalled in a respective carriage 30 which is itself coupled to a hydraulic actuator 32 whereby an adjustable translational force can be applied to the roller/carriage combination. As well as being capable of translational motion the roller/carriage combination is able to rotate about an axis determined by the hydraulic actuator 32 to change the "tilt angle" of the roller and to move the contacts between rollers and discs, thereby varying the variator transmission ratio, as is well known to those skilled in the art.

The illustrated variator is of the type known in the art as "torque control". The hydraulic actuator 32 exerts a controlled force on the roller/carriage and for equilibrium this must be balanced by the reaction force upon the roller resulting from the torques transmitted between the disc surfaces 18, 20, 22, 24 and the roller 28. The axis determined by the actuator 32 is angled to the plane perpendicular to the variator axis. This angle is referred to as the "castor angle". The well known result of this arrangement is that in use each roller automatically moves and precesses to the location and tilt angle required to transmit a reaction torque determined by the biasing force from the actuator 32. Reaction torque, in this context, means the sum of the torques input to and output from the variator. The force from the actuator 32 is controlled by means of a hydraulic circuit through which fluid is supplied to the actuators at a variable pressure.

The present invention is however, applicable to variators of so-called "ratio control" type in which roller position is sensed and adjusted to provide a chosen ratio.

Figure 2:
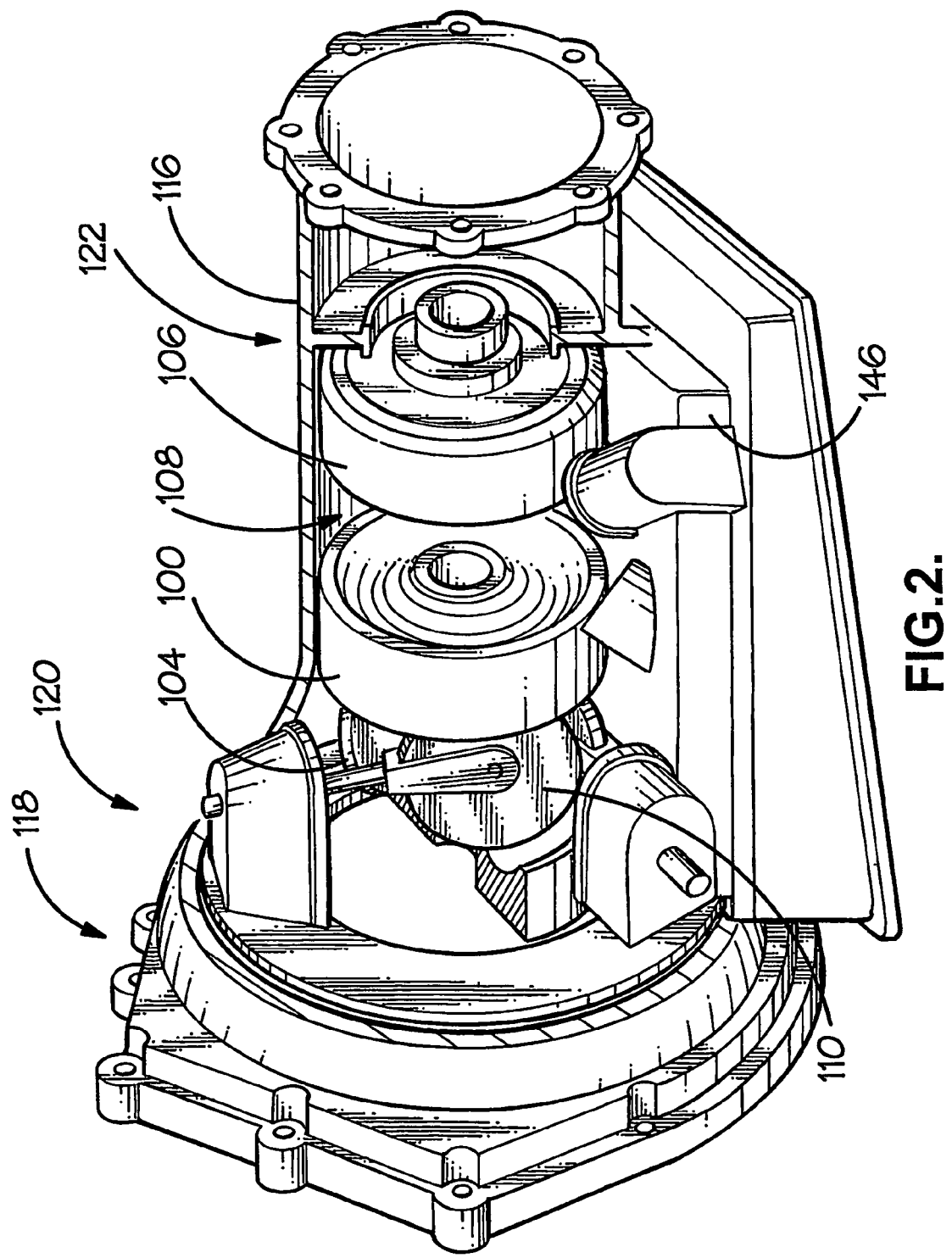
FIG. 2 is a simplified perspective illustration of a variator constructed according to the present invention, a variator housing being shown broken away so that interior components of the variator can be seen and certain components being omitted for the sake of clarity.
Figure 3:
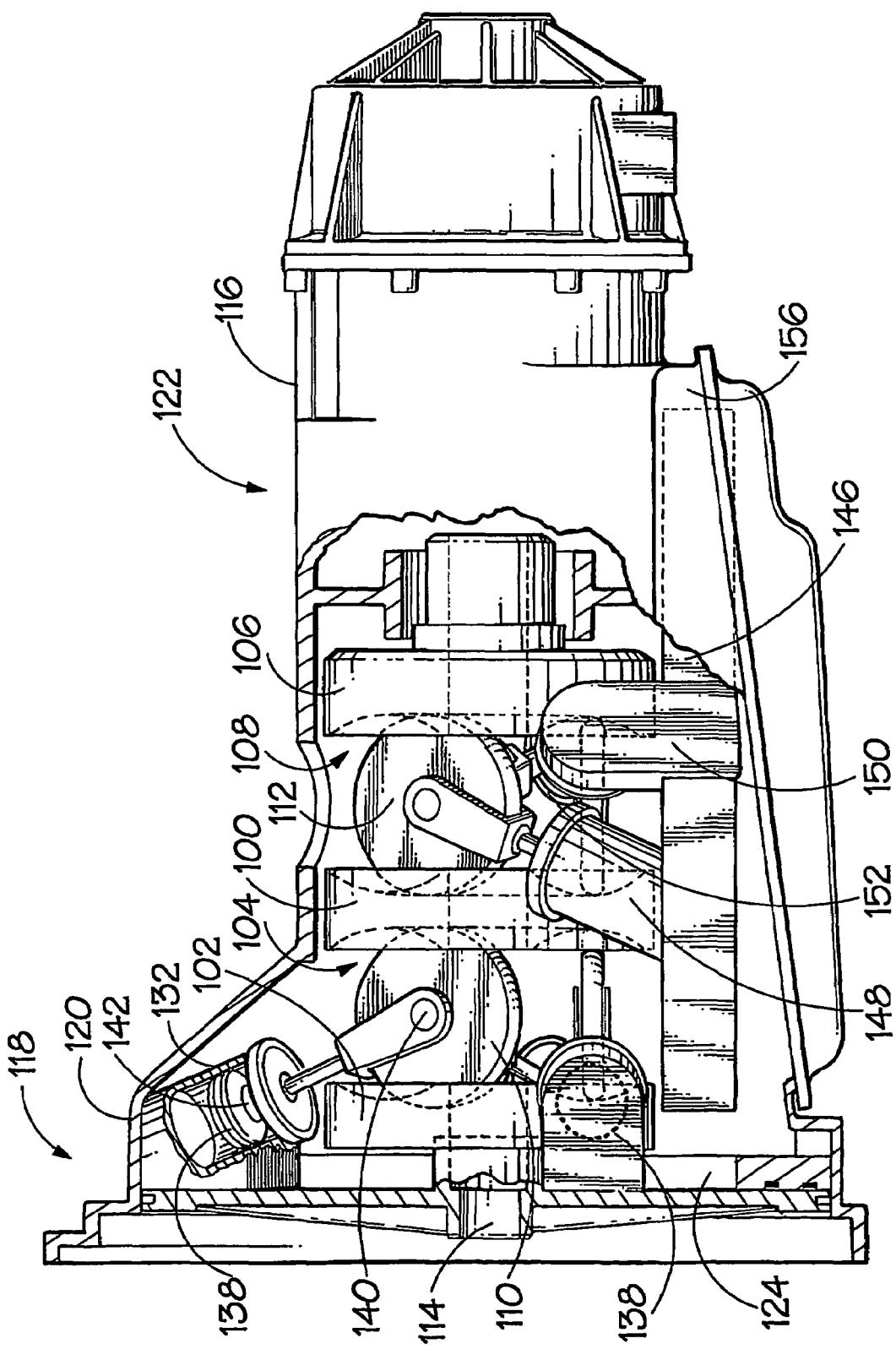
FIG. 3 is a view along a radial direction of the same variator, the housing again being shown broken away to reveal interior components.

In FIG. 2 onward the variator's output disc is seen at 100. A first input disc 102 (half of which is omitted from FIG. 2 for clarity) defines with the output disc 100 a first toroidal variator cavity 104 and a second input disc 106 defines with the output disc 100 a second toroidal variator cavity 108. A set of first rollers 110 is disposed in the first toroidal cavity. A set of second rollers 112 (omitted from FIG. 2 but seen in FIG. 3) is disposed in the second toroidal cavity. In the illustrated embodiment there are three first rollers 110 and three second rollers 112. The discs 100, 102, 106 are journalled about a variator axis defined by a main shaft, which again is omitted from FIG. 2 for the sake of representational clarity but passes through bores labelled 114 in FIG. 3.

The rollers, discs and shaft are all contained within a housing 116. In the present embodiment the housing is a cast and machined metal structure. The shape of the housing is well, suited to incorporation into the tunnel of a conventional rear wheel drive motor car, its end 118 which lies toward the car's engine in use being relatively wide but leading via a tapering, frusto-conical transition region 120 to a narrower section 122. This housing shape creates potential difficulties in assembly of the variator but such problems are avoided in the illustrated embodiment by breaking down some major variator components into a set of sub-assemblies, as will now be explained.

Figure 5:
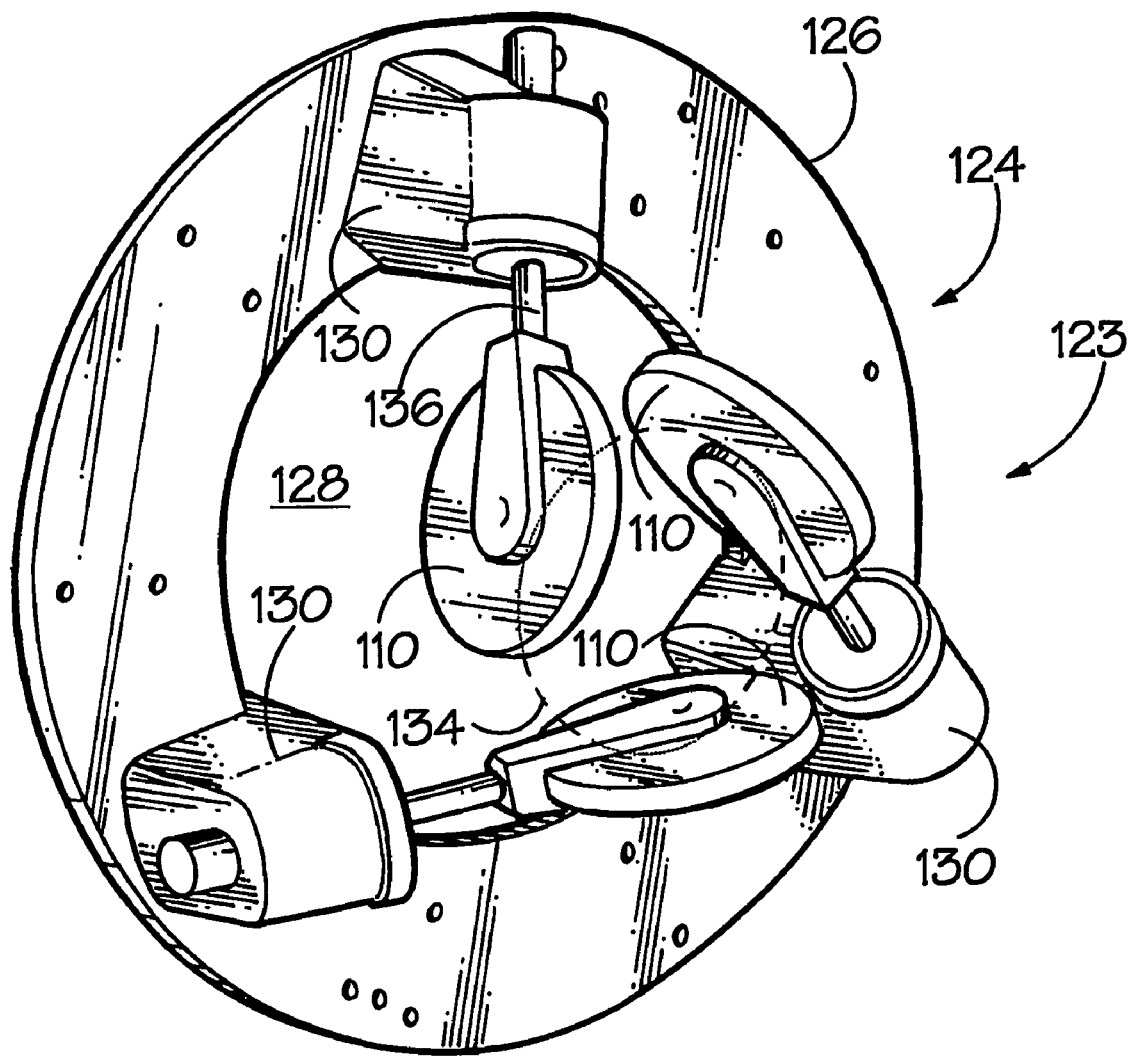
FIG. 5 is a perspective illustration of a first sub-assembly of the variator.

A first sub-assembly 123 is illustrated separately from the housing and other variator components in FIG. 5 and comprises a first carrier part 124 having in the present embodiment a plate 126 with a circular perimeter and a concentric circular cut-away 128. Regularly spaced about the plate 126 are three actuator housings 130 respectively defining three roller control cylinders which are not seen in FIG. 5 but one of which can be discerned at 132 in FIG. 3. In the illustrated embodiment the actuator housings 130 are integral with the plate 126, these parts being formed by a single casting. However it will be apparent that, for convenience of manufacture, these parts could be formed by separate components and bolted or otherwise fastened together. A preferred manufacturing technique is to form the actuator housings from aluminum, the cylinder bores being hard anodised and not requiring a cylinder liner. In the illustrated example the three actuator housings 130 are equally angularly spaced about the variator axis (i.e. are at 120° intervals). A circle indicated at 134 in FIG. 5 is the centre circle of the first toroidal cavity in the assembled variator. As the first rollers 110 and their associated piston rods 136 and pistons 138 (seen in FIG. 3) move, the centres of the rollers are constrained by the variator discs to move along the circle 134. The actuator housings 130 are aligned to urge the rollers approximately along respective tangents to the circle 134, although it can be seen in FIG. 3 that the line from the roller centre 140 to the piston centre 142 is inclined to the plane of the circle 134 (i.e. to the plane perpendicular to the variator axis) this inclination being the aforementioned castor angle.

A second sub-assembly of the variator comprises a second carrier part formed as a carrier block 146. The carrier block 146 carries the actuator housings 148, 150, 152 associated with the three second rollers 112. Housing 152 is in the background and is largely hidden in FIG. 3. Note that whereas the first carrier part lies around the variator axis, the carrier block 146 lies to one side of the axis. To put this in more precise geometric terms, the block 146 and the actuator housings 148, 150, 152 in the present example all lie to one side of a plane containing the variator axis. Placing three actuators to one side of the variator axis is not new in itself, having been disclosed in the applicant's aforementioned International Patent Application PCT/GB99/02968, which shows suitable actuator orientation and the full disclosure of which is hereby incorporated herein by reference. As in PCT/GB99/02968, the actuator housings 148, 150, 152 associated with the second toroidal cavity are all intersected by a common plane parallel to the variator axis and can be referred to in this sense as being "co-planar".

Two of the actuator housings 148, 150 are juxtaposed in this arrangement but are separated along the direction of the variator axis. The orientations of the second actuator housings 148, 150, 152 result in the rollers being equally angularly spaced about the variator axis even though their actuators are not.

To receive the first carrier part 124, the variator housing 116 has an axially facing recess 154 (see FIG. 4) which is circular and concentric with the variator axis. To receive the second carrier part 146, the variator housing has a radially facing rectangular recess in a region 156. Assembly of the variator is particularly straightforward. The two sub-assemblies referred to above can be assembled before the carrier parts 124, 146 are mated to the housing 116, after which second carrier part 146 is advanced along a direction non-parallel to the housing—in the illustrated embodiment this direction is generally radial with respect to the variator axis—and so mated with the housing. The first carrier part is advanced along a direction generally parallel to the variator axis and is thereby introduced to its recess 156 and mated with the housing 116.

The arrangement of the actuator housings not only allows for convenient assembly but also enables them to be arranged in the bell-mouthed housing 116 in a space-saving manner. At the wider region of the housing 116, the first actuator housings 130 associated with the first toroidal cavity are at regular angular intervals about the variator axis making good use of the extra width and height available here. At the narrower region of housing the placement of the second actuator housings 148, 150, 152 allows them to be fitted into the available space.

Figure 4:
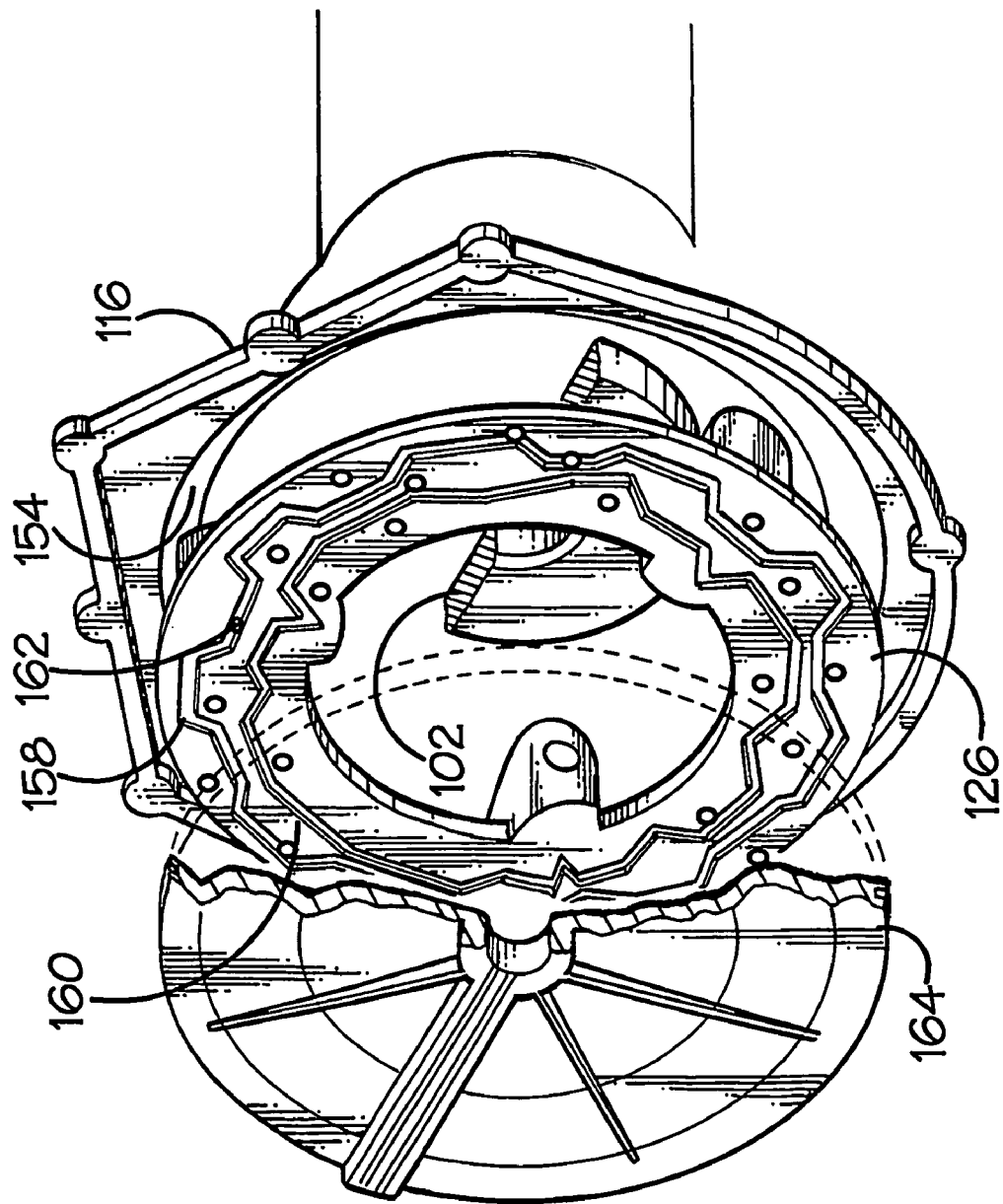
FIG. 4 is an exploded, perspective illustration of parts of the same variator viewed from one end and to one side thereof.

The illustrated arrangement provides for fluid supply to the roller control actuators in a constructionally convenient manner. In FIG. 4 it can be seen that the first carrier part forms a manifold for the fluid supply by virtue of two generally circumferentially extending channels 158, 160 formed in the rear face of the plate 126 and communicating with the actuators themselves through axial bores such as 162. One of the channels 158 conducts fluid to a working chamber of each actuator to urge the rollers in one direction (clockwise) while the other of the channels 160 conducts fluid to an opposed working chamber of each actuator to urge the rollers in an opposite direction (anti-clockwise). The two channels 158, 160 are connected to different regions of a hydraulic control circuit (not itself illustrated) which applies two different adjustable pressures thereto in order to control the variator.

A back plate 164 covers the rear face of the plate 126 and confines fluid in the channels 158, 160. Of course the channels could be machined in the back plate rather than, or as well as, the plate 126 if desired.

The second carrier part 146 can also form a manifold, by virtue of channels formed within the part 146 or in its surface, for distribution of hydraulic fluid.

Figure 6:
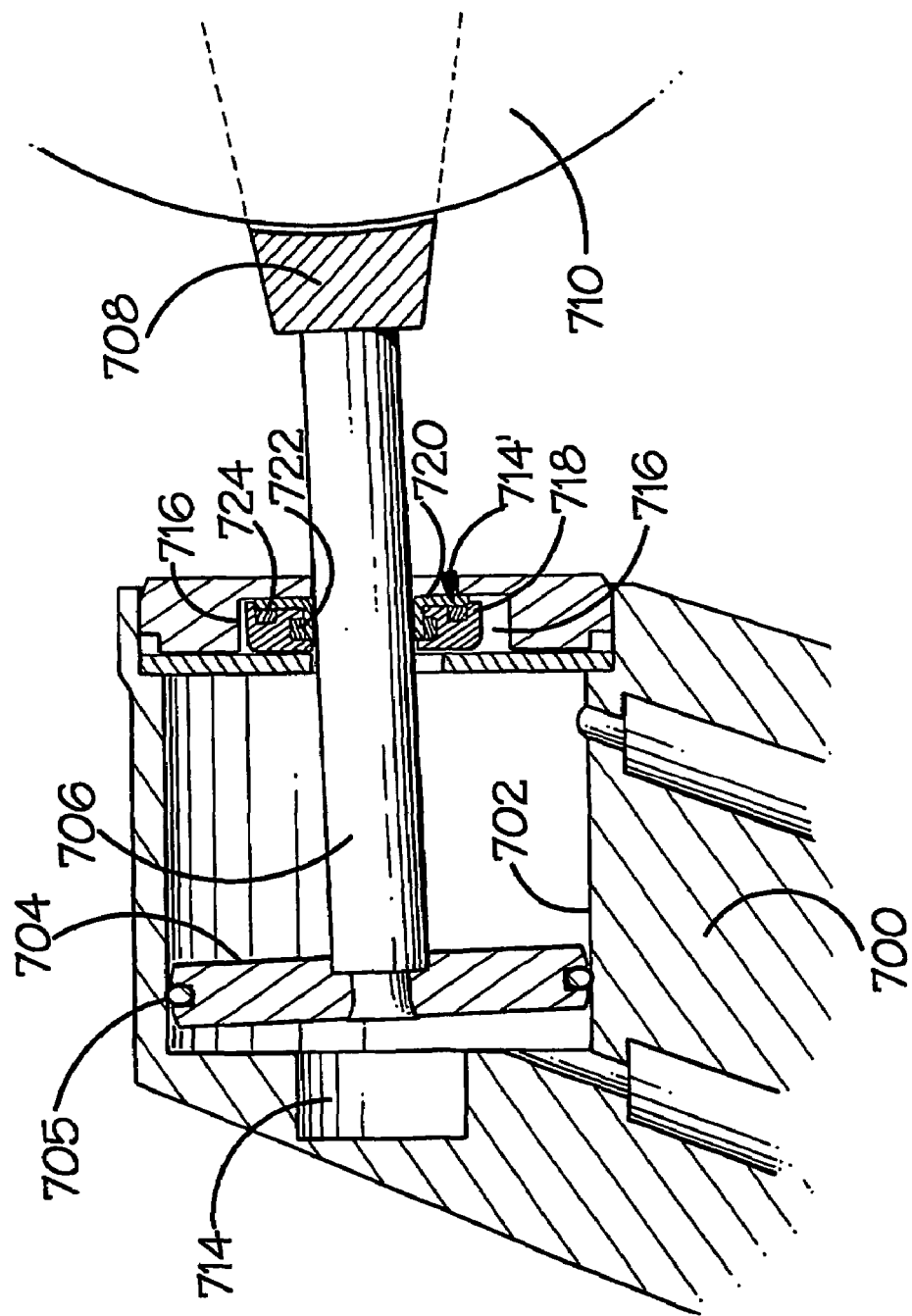
FIG. 6 is a section in an axial plane through an actuator used in the variator.

Looking now at FIG. 6, the construction of one of the actuators used in the variator will now be described. The actuator housing is in this drawing indicated at 700 and is formed by an aluminum casting with a hard anodised bore 702 forming a cylinder to receive a piston 704. A piston rod 706 connects the piston to a carriage 708 carrying the variator roller 710. The required seal between piston and cylinder is maintained by a seal 705 in an annular recess in the piston and some "swashing"—angular movement of the axis of the piston/piston rod—is permitted without loss of this seal. It can be seen in the drawing that the piston/piston rod assembly is slightly angled to the cylinder as a result of this swashing, which is necessary in order to permit the centre of the roller 710 to follow a path which is an arc of a circle, corresponding to the centre circle of the toroidal cavity in which the roller runs.

The actuator is double-acting, having opposed working chambers 714, 716 on opposite sides of the piston 704. It is necessary to maintain a seal where the piston rod 706 emerges from the cylinder despite the lateral movement of the piston rod in this region resulting from its swashing motion and this is achieved by a floating seal arrangement 714 received in an annular recess 716 and capable of limited lateral movement The seal arrangement comprises a ring 718 formed in this embodiment of plastics and carrying an "L" section sealing band 720 biased radially inwardly by a first pre-stressed resilient loop 722 to form a seal against the piston rod 706 and also biased along an axial direction by a second pre-stressed resilient loop 724. Lateral movement of the piston rod 706 displaces the seal arrangement 714 in its recess 716 but does not impair the seal provided.

Ports 726, 728 are provided in the casting forming the actuator housing for fluid supply to the chambers 714, 716.

The invention claimed is:

1. A continuously variable ratio transmission unit ("variator") comprising a housing, a first input/output disc pair defining a first variator cavity, a second input/output disc pair defining a second variator cavity, the discs being mounted to the housing for rotation about a common variator axis, at least one first roller disposed in the first variator cavity and at least one second roller disposed in the second variator cavity, the rollers serving in use to transmit drive between the input and output discs, a first actuator for applying a biasing force to the first roller and a second actuator for applying an adjustable biasing force to the second roller, wherein the first actuator is coupled to a first carrier part, the housing and the first carrier part being formed such that the first carrier part can be mated with the housing by introducing the first carrier part to the housing along a direction substantially parallel to the variator axis, and the second actuator is coupled to a second carrier part, the housing and the second carrier part being formed such that the second carrier part can be mated with the housing by introducing the second carrier part to the housing along a direction non-parallel to the variator axis.

2. A variator as claimed in claim 1 comprising at least three second rollers each acted on by a respective second actuator, wherein the second actuators all lie on the same side of a notional plane containing the variator axis.

3. A variator as claimed in claim 2 comprising at least three first rollers each acted on by a respective first actuator, wherein the first actuators are angularly spaced about the variator axis and are thus disposed to either side of the said plane.

4. A variator as claimed in claim 2 wherein the second actuators comprise actuator housings which are co-planar.

5. A variator as claimed in claim 3 wherein the first actuators are spaced at equal angular intervals about the variator axis.

6. A variator as claimed in claim 1 wherein the actuators are hydraulic and the first carrier part comprises a plate lying around the variator axis, circumferentially extending fluid supply conduits being formed in or adjacent said plate for feeding fluid to/from the first actuator.

7. A variator as claimed in claim 6 wherein a back plate lies adjacent the first carrier part, the fluid supply conduits being formed between faces of the first carrier part and the back plate.

8. A variator as claimed in claim 1 wherein the housing provides an axially facing recess which receives the first carrier part.

9. A variator as claimed in claim 1 wherein the housing provides a radially facing recess which receives the second carrier part.

10. A method of constructing a continuously variable ratio transmission unit ("variator") comprising a housing, a first input/output disc pair defining a first variator cavity, a second input/output disc pair defining a second variator cavity, the discs being mounted to the housing for rotation about a common variator axis, at least one first roller disposed in the first variator cavity and at least one second roller disposed in the second variator cavity, a first actuator for applying a biasing force to the first roller and a second actuator for applying an adjustable biasing force to the second roller, the method comprising constructing the first actuator on a first carrier part and advancing the first carrier part in a direction along the variator axis to thereby mate the first carrier part to the housing, constructing the second actuator on a second carrier and advancing the second carrier part along a direction non-parallel to the variator axis to thereby mate the second carrier part to the housing.

\* \* \* \* \*

UNITED STATES PATENT AND TRADEMARK OFFICE
CERTIFICATE OF CORRECTION

| | |
|---|---|
| PATENT NO. | : 7,637,841 B2 |
| APPLICATION NO. | : 10/532484 |
| DATED | : December 29, 2009 |
| INVENTOR(S) | : Brian Joseph Dutson |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1026 days.

Signed and Sealed this

Ninth Day of November, 2010

David J. Kappos
*Director of the United States Patent and Trademark Office*